(No Model.) 4 Sheets—Sheet 1.

L. W. TURNER & G. J. CAPEWELL.
STOVE.

No. 310,623. Patented Jan. 13, 1885.

WITNESSES
Robert Everett
George Tilghman

INVENTORS
L. W. Turner
Geo. J. Capewell
by W. H. Babcock
Attorney (No Model.) 4 Sheets—Sheet 2.

L. W. TURNER & G. J. CAPEWELL.
STOVE.

No. 310,623. Patented Jan. 13, 1885.

WITNESSES
Robert Everett.
George Tilghman

INVENTORS
L. W. Turner
and Geo. J. Capewell
by W. H. Babcock
Attorney (No Model.) 4 Sheets—Sheet 3.

L. W. TURNER & G. J. CAPEWELL.
STOVE.

No. 310,623. Patented Jan. 13, 1885.

WITNESSES
Robert Everett,
George Tilghman

INVENTORS
L. W. Turner
and Geo. J. Capewell
by W. H. Babcock
Attorney (No Model.) 4 Sheets—Sheet 4.
L. W. TURNER & G. J. CAPEWELL.
STOVE.
No. 310,623. Patented Jan. 13, 1885.
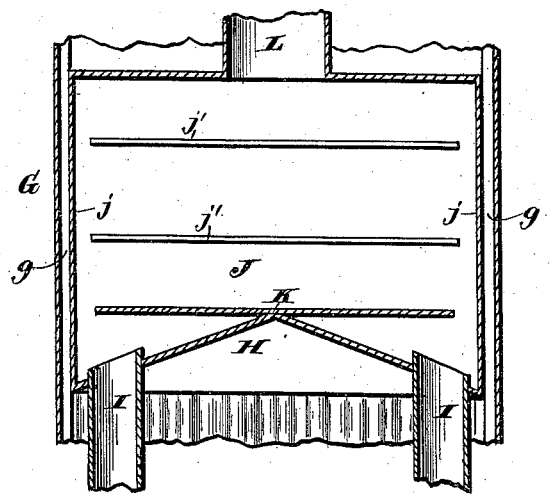
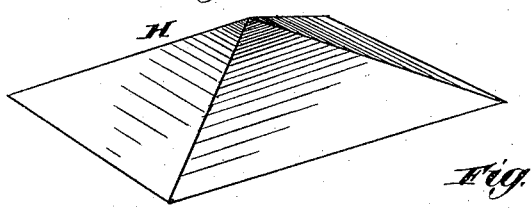
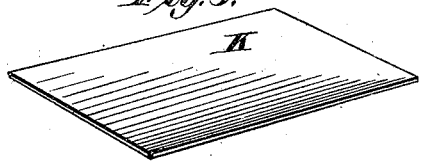
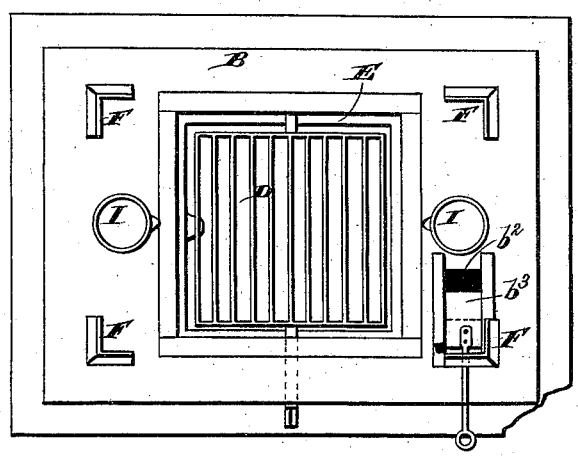

UNITED STATES PATENT OFFICE.

LEWIS W. TURNER, OF YALESVILLE, AND GEORGE J. CAPEWELL, OF CHESHIRE, CONNECTICUT.

STOVE.

SPECIFICATION forming part of Letters Patent No. 310,623, dated January 13, 1885.

Application filed August 8, 1883. (No model.)

*To all whom it may concern:*

Be it known that we, L. W. TURNER and GEORGE J. CAPEWELL, both citizens of the United States, the former residing at Yalesville, and the latter at Cheshire, both in the county of New Haven and State of Connecticut, have invented certain new and useful Improvements in Stoves; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to stoves which are provided with an air-chamber above the fire-pot.

It consists, partly, in providing the same with a conical or pyramidal bottom and pipes which extend up through the same to the interior of said air-chamber; partly in the adaptation of the air-chamber thus constructed and heated to the purposes of an oven; partly in the fluted construction of the exterior walls of the stove, and partly in other improvements, hereinafter particularly set forth and claimed.

Figure 1:
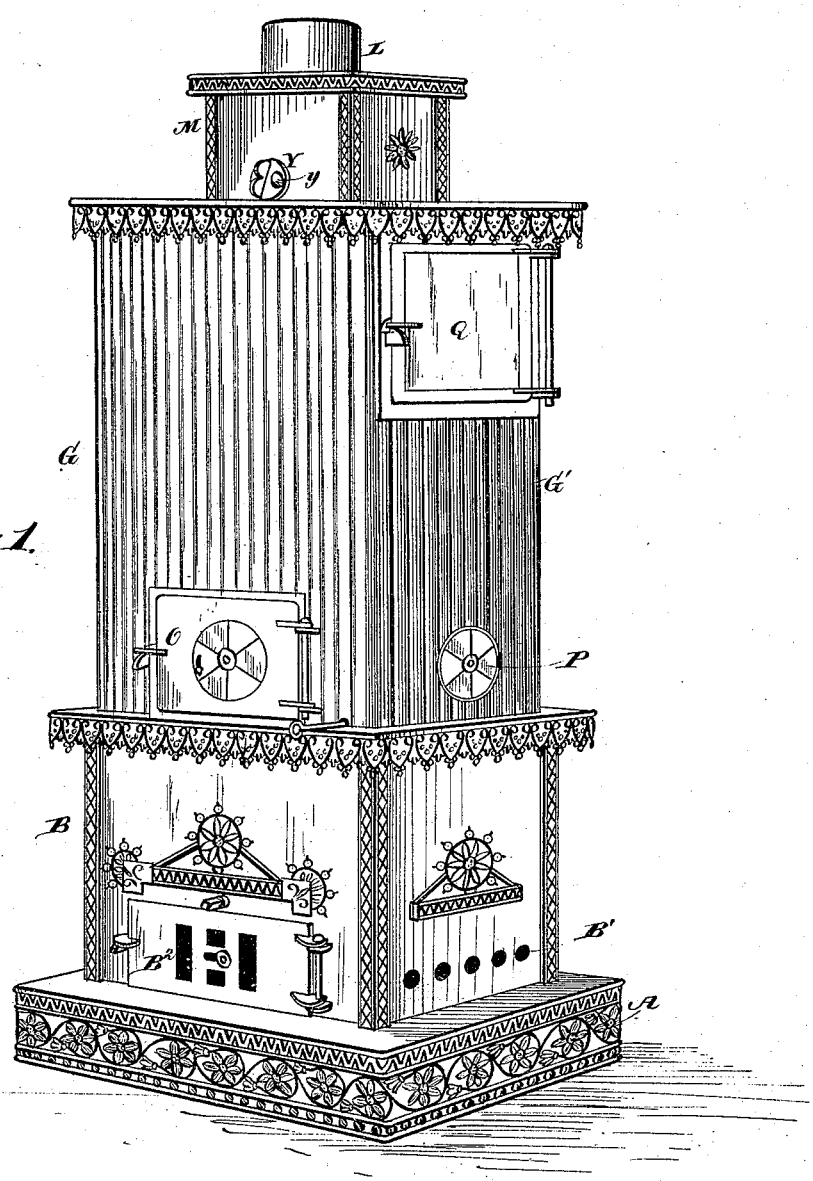
Figure 2:
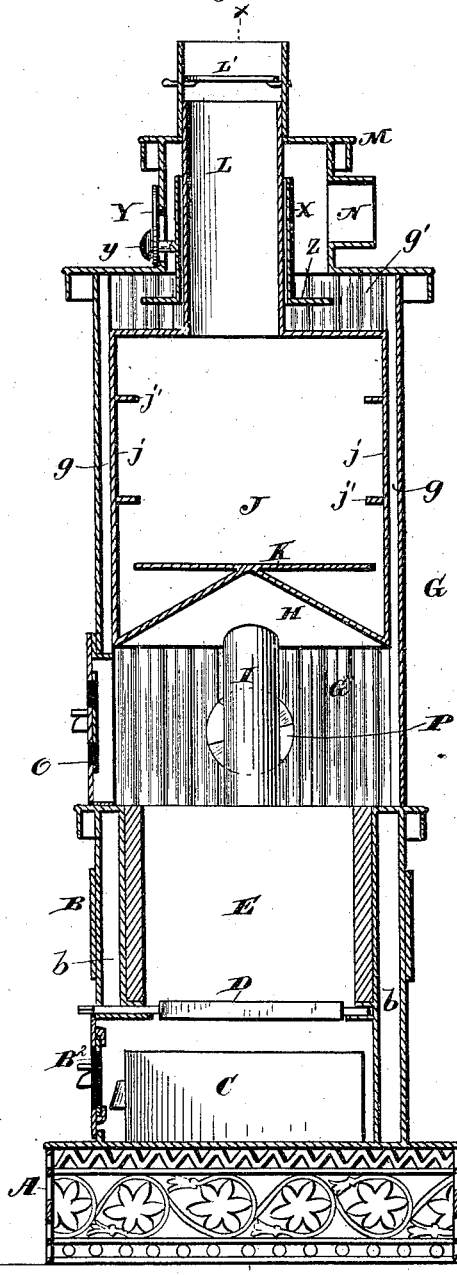
Figure 3:
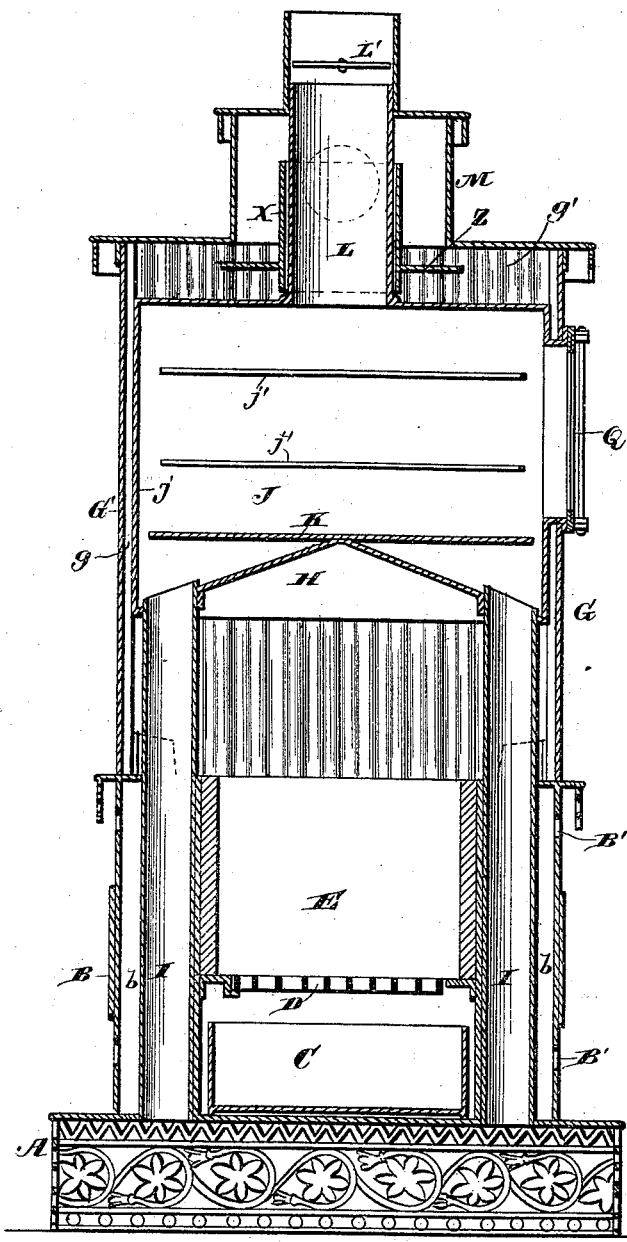

In the accompanying drawings, Figure 1 represents an exterior perspective view of a parlor-stove embodying my invention. Fig. 2 represents a vertical central section of the same from front to rear. Fig. 3 represents a vertical section of the same from side to side on line $x$ $x$ of Fig. 2. Fig. 4 represents a detail view of the pyramidal bottom of the air-chamber. Fig. 5 represents a similar view of the table or platform supported thereon. Fig. 6 represents a sectional view of a modification which has no door for the air-chamber. Fig. 7 represents a detail view of the devices for regulating the draft through the fire-pot.

A represents the base of our stove, the walls of which may be ornamented by open-work, as shown. These walls inclose an open space which extends under the stove and allows access of air to vertical pipes I I, hereinafter described. On this base is erected a rectangular double-walled casing, B, forming the lower section of the body of the stove, and inclosing the removable ash-box C, the grate D, and the fire-pot E. These parts do not present any novelty in their construction or arrangement. The hollow space $b$ between the walls of said casing or section B has communication with the outer air by openings B', through which a portion of the heated air escapes to assist in warming the room in which the stove is placed. The front opening, through which the ash-box is withdrawn, is closed by a door, B². The space $b$ is closed at top except another opening, $b^2$, provided with a sliding damper, $b^3$, which has a handle reaching outside the stove. By means of this damper air may be supplied to the space above, this air being drawn through openings B' and space $b$. When this is done and the damper that admits air below the grate is closed, the fire will be kept alive with very little consumption of fuel.

On the top of section or casing B are four angular stops, F, arranged to fit into the four corners of a rectangular upper section, G. Across the interior of this upper section or casing, at a distance above the fire-pot, is arranged a pyramidal plate, H, which nearly fills the internal periphery of said section G, leaving a space for the passage of air around its edges, and forms a bottom for an air-chamber, J, arranged within said casing or section. This air-chamber is heated by the products of combustion, which ascend from the fire-pot and eddy around in the hollow formed by the pyramidal bottom plate, H, afterward passing upward along the sides of said air-chamber. To prevent the heat from scorching the contents of said air-chamber or oven, we employ two tubes, I, which extend up from the bottom of lower section, B, and to and into the said air-chamber J, admitting external air to the said air-chamber. These pipes do not pass through the fire-box, nor are they formed in the walls thereof, but are independent devices, which need not be in contact therewith. The air, which passes rapidly through them from outside the stove, enters the air-chamber at such a temperature as to effectually prevent scorching. This plate is supported upon the top of pyramidal bottom H. Its edges do not touch the side walls, j, of the said air-chamber, and there is therefore space for the ascent of air around said plate K. This plate acts as a shield to protect articles contained in the interior of said air-space from the directly-radiated heat from the pyramidal bottom H and the fire below. It also constitutes a platform or table on which articles may be securely set, as on the bottom of an oven. The sides j of said air-chamber are also provided with horizontal flanges j', which are adapted to receive frames or gratings for a similar purpose. The air-chamber thus constructed is therefore practically an oven as well. The air passes from this chamber or oven through an outlet-pipe, L, which is provided with a damper, L', whereby the draft through said air-chamber, and consequently the heating of the air escaping from it, may be regulated at will. As the products of combustion and the air directly arising from the burning fuel do not enter the oven, and are deflected by pyramidal plate or bottom H before being even applied to the exterior of side walls, j, of said chamber, a very considerable degree of heat may be maintained within the latter without danger of scorching anything which it contains. The exterior wall, G', of section G is fluted or corrugated, as shown, from top to bottom, in order to increase the radiating-surface. Between the inner face of this wall G' and the side walls, j, of air-chamber J there is a space, g, which communicates with the space below pyramidal bottom H. As the outer edges of this pyramidal bottom are cast with or riveted or otherwise securely attached to the bottom edges of side walls, j, leaving no space between said edges, the products of combustion, after eddying around under said bottom H and further heating the pipes I, necessarily pass up through space g to a similar space, g', at the top of section G. Thence they pass to a drum or case, M, erected on said section G and surrounding the outlet-pipe L aforesaid, so as to further heat the air in said pipe before it issues to the apartment. A flue, N, conducts the products of combustion from said drum or casing to the outer air. The casing or upper section, G, is provided with a door, O, below the level of the pyramidal bottom H of the air-chamber J, and this door is provided with a central opening or openings closed with mica, and having an internal register-shield, which is adapted to be turned, so as to uncover said mica when inspection of the interior of the stove is desired, but otherwise protects said mica from the heat. At the sides of said casing, on a level with said door, similar windows of mica are introduced for the same purpose as that of said openings, as shown at P. Access to the interior of air-chamber or oven J is given by means of a door, Q, which preferably consists of a transparent body or sheet in a metallic frame.

Of course the form and arrangement of the several parts and of the stove as a whole may be considerably varied without departing from our invention. When the body of the stove is cylindrical, the bottom plate, H, of air-chamber J will naturally be conical. In either case it tapers to a point, and this is all that is essential. Instead of allowing the heated air to escape in the room where the stove stands, it may of course be conveyed by pipe L to another room, and there used for any calorific purpose. The combustion is governed by a valve, Z, which is attached to a sleeve, X, that surrounds the outlet-pipe for heated air. This sleeve is operated by means of an eccentric button, Y, on the outside of the drum aforesaid, and a stud, y, attached to said button and extending through said case or drum to said sleeve. When the sleeve is raised to its highest position, it causes valve Z to cut off the draft. When moved down to its lowest position, it opens the draft to the maximum, and thus causes the greatest practicable amount of combustion. This device is better than a simple damper in the stove-pipe, as the stove and air-chamber can be more evenly heated, the space being equal on all sides. Instead of using two pipes, as shown, for supplying air to the air-chamber, any other convenient number, from one upward, may be employed. They should be about half the area in cross-section of the outlet-pipe. This excess of the capacity of the outlet-pipe over that of the inlet-pipes allows the air to rush freely out after it is heated, while fresh air flows in rapidly through the smaller pipes to take its place. Of course the proportions may be considerably varied.

As shown in Fig. 6, the door opening into the air-chamber may be dispensed with when said chamber is not to be used as an oven. All sides of said chamber are then alike, and the same is true of the corresponding parts of upper stove-section, G.

In our application No. 106,919, filed September 30, 1883, we have shown an air-chamber or oven and the inlet and outlet pipes thereof, together with the other devices which form the subject-matter of our present claims; but we do not claim them in said application. There are no other devices or elements common to the two cases.

We are aware that it is not broadly new to use an oven in combination with heating devices, separate outlets for said oven and said heating devices respectively, and inlets for conveying external air to said oven; but as heretofore constructed such inlets have been arranged to allow and insure the heating of the air thus introduced, the object of the apparatus being to introduce heated air into the oven and cook by the heat thereof. This construction we do not claim, our object being quite different, and the external air being introduced by us to temper the heat of the oven.

Having thus described our invention, what we claim as new, and desire to secure by Letters Patent, is—

1. An oven, in combination with heating devices operating on the exterior of said oven, independent outlets for said heating devices and said oven respectively, and vertical inlet-pipes exterior to and independent of the fire-box, extending from said oven to the exterior of the stove or furnace for the purpose of allowing the passage of cool external air directly to said oven without passing through or in contact with the fire-box, substantially as set forth.

2. The combination of an air-chamber or oven and its outlet-pipe L, a drum, M, through which the products of combustion pass, a sleeve surrounding said outlet-pipe, an eccentric button on said drum, which operates said sleeve, and a damper carried by said sleeve, and arranged below said drum in such manner that the raising or lowering of said sleeve controls the space between said outlet-pipe and said drum, substantially as set forth.

In testimony whereof we affix our signatures in presence of two witnesses.

LEWIS W. TURNER.
GEORGE J. CAPEWELL.

Witnesses:
EDWARD A. CORNWALL,
EUNICE B. CORNWALL.